June 16, 1953  J. F. McSHANE ET AL  2,641,894
RECIPROCATING BLADE LAWN MOWER
Filed March 1, 1949  3 Sheets-Sheet 1

Inventors:
John F. McShane
and Walter Logan
By
Attorneys.

Inventors.
John F. McShane
and Walter Logan
By *Brumbaugh & White*
Attorneys.

June 16, 1953

J. F. McSHANE ET AL 2,641,894

RECIPROCATING BLADE LAWN MOWER

Filed March 1, 1949

Inventors:
John F. McShane
and Walter Logan
By
Attorneys.

Patented June 16, 1953

2,641,894

UNITED STATES PATENT OFFICE 2,641,894

RECIPROCATING BLADE LAWN MOWER

John F. McShane and Walter Logan, Greenwood, R. I., assignors to L & M Engineering Corp., a corporation of Rhode Island Application March 1, 1949, Serial No. 79,086

8 Claims. (Cl. 56—263)

This invention relates to mowing machines, and more particularly to lawn-movers for either manual operation or adapted to be driven by power-means such as an internal combustion engine.

One object of the invention is to provide a machine of the type indicated having transverse cutter-bars arranged for relative reciprocation by the travel of the machine and provided with knives or sharpened teeth for cutting the grass between their cooperating edges.

Another object is to provide in a machine of the type indicated, means for adjusting the height of the cutter-bars and knife-blades in relation to the ground without disturbing the connection between the operating mechanism and the reciprocable cutter-bar.

Another object is to provide an improved construction of the cutter-bars to adapt them to gather leaning or inclined grass-spears and present them to the cutting edges of the knives in erect position whereby to insure an evenly cut lawn.

Another object is to provide an arrangement of the cutter-bars adapted to operate in such manner as to eliminate any shearing action tending to force some of the fine grass-spears out of their erect position between the knives.

Another object is to provide in a machine of the type indicated, an improved method of operation of the cutter-bars to insure the cutting of any surplus grass that may flicker into place between the knives.

Another object is to provide in a machine of the type indicated, means for operating the reciprocating cutter-bar from the traction wheels through the intermediary of fixedly-related cams which are proof against disruption of their timed action.

Another object is to provide a machine of the type indicated having a rocker-element for operating the reciprocable cutter-bar and comprising a transverse shaft driven from the traction-wheels with cams thereon engaging rollers on the rocker-element to oscillate it during the travel of the machine.

Another object is to provide a machine of the type indicated having friction-reducing bearings to render it more easily operated by propelling it along the ground.

Another object is to provide a machine of the type indicated of simple construction with its parts proof against wear and deterioration and more economical to manufacture and assemble.

Further objects of the improvement are set forth in the following specification which describes a preferred form of construction of the machine, by way of example, as illustrated by the accompanying drawings. In the drawings.

Figure 1:
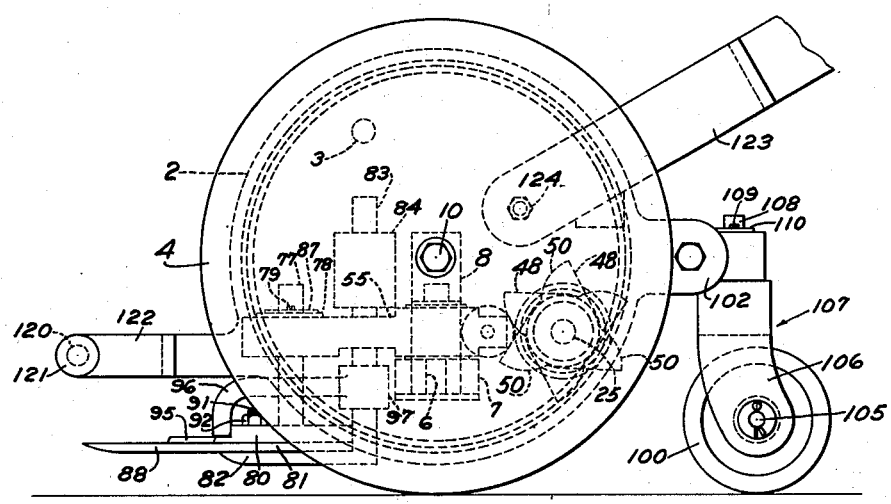
Fig. 1 is an end elevational view of the present improved lawn-mower shown in position for propelling it along the ground.
Figure 2:
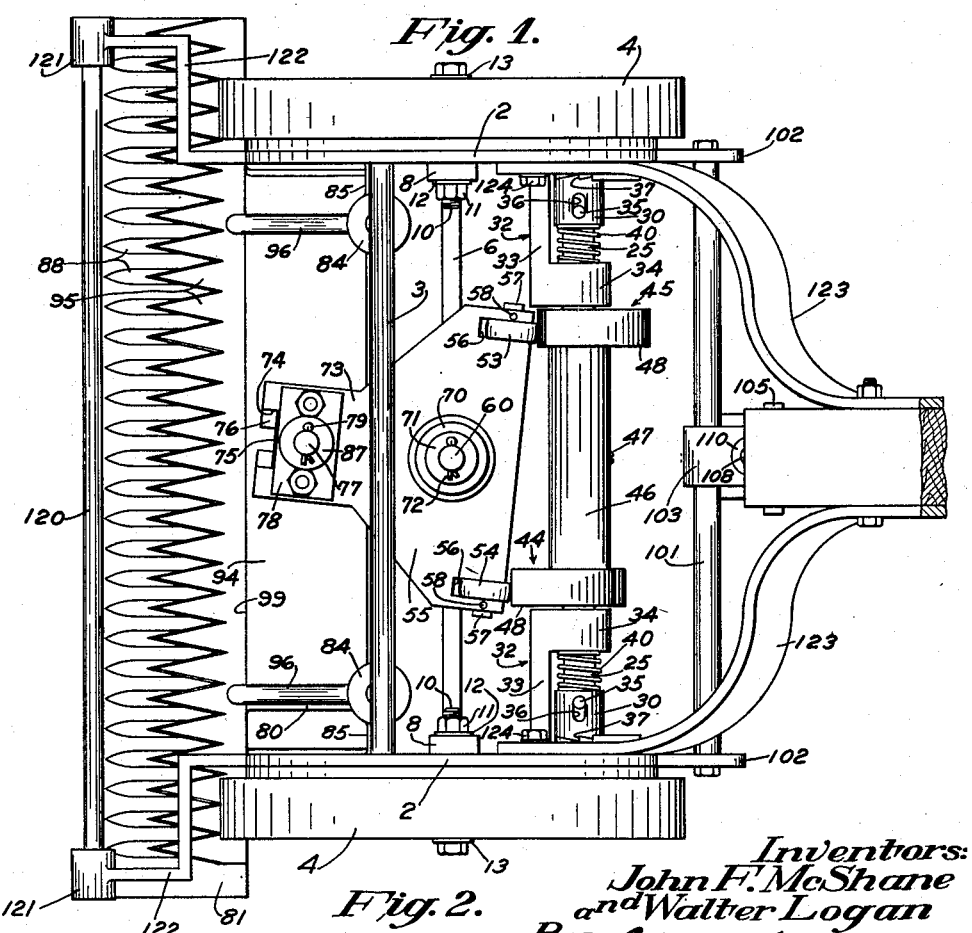
Fig. 2 is a plan view of the same.

We are aware that heretofore lawn-mowers have been provided with a relatively-fixed and a slidable cutter-bar having teeth or the like for cutting the grass with means for reciprocating the slidable bar from the rotation of the traction-wheels when the mower is propelled along the ground. The machine of the present invention is generally of this type but embodies several important improvements in the construction and arrangement of the cutter-bars, their operating mechanism including the drive therefor, and also in the structure and method of assembly of the various parts of the machine.

Referring to the drawings, the present machine comprises a main frame constituted by a pair of parallel spaced-apart plates 2 of disk-shape connected by transverse struts or braces and forming the mounting for a pair of traction-wheels 4. Extending between the side plates or disks 2 above the center thereof is a transverse rod or stretcher 3 secured thereto by bolts 5 inserted through holes in the plates and screwed into the ends of the rod. Below the center of the plates is a crossbar or strut 6 formed with a rectangular bearing-block 7 at its center and uprights or vertical extensions 8 at its opposite ends. The extensions 8 provide brackets for fastening the ends of the crossbar 6 to the inner faces of the plates or disks 2. The brackets 8 are attached to the side plates 2 by means of bolts 10 which serve as the axles for the traction-wheels 4. Preferably, the bolts 10 are inserted from the outside through holes in the plates 2 and brackets 8 with nuts 11 on their inner ends set up against washers 12 to clamp the brackets to the inner faces of the plates. Needle-bearings 15 are provided surrounding the axle-bolts 10 to serve as friction-reducing journals for the traction-wheels 4, with washers 13 under the heads of the bolts set up against the ends of the bearing-races for holding the wheels in place.

The traction-wheels 4 are of hollow construction having hubs 16 journaled on the needle-bearings 15 and radial flanges 17 supporting enlarged peripheral rims 18. The rim 18 of each wheel is recessed on the inside to form a circumferential shouldered seat 19 for receiving a gear-ring 20 forced thereinto and provided with internal teeth 21. The teeth 21 of the gear-rings 20 mesh with the teeth 23 of a pair of pinion-gears 22 mounted on the opposite ends of a cam-shaft 25 projecting through openings in the side plates 2.

Each pinion-gear 22 is provided with a hub 26 mounted free to rotate on the end of the cam-shaft 25. The pinions 22 are held in place on the ends of the cam-shaft 25 in abutting relation to the outer faces of the plates 2 by the ends of their teeth 23 engaging against the bottom of the recess 19 in which the ring-gear 20 is held. The pinions 22 are connected to drive the cam-shaft 25 through means of clutches 30 engageable with the ends of their hubs 26.

Figure 3:
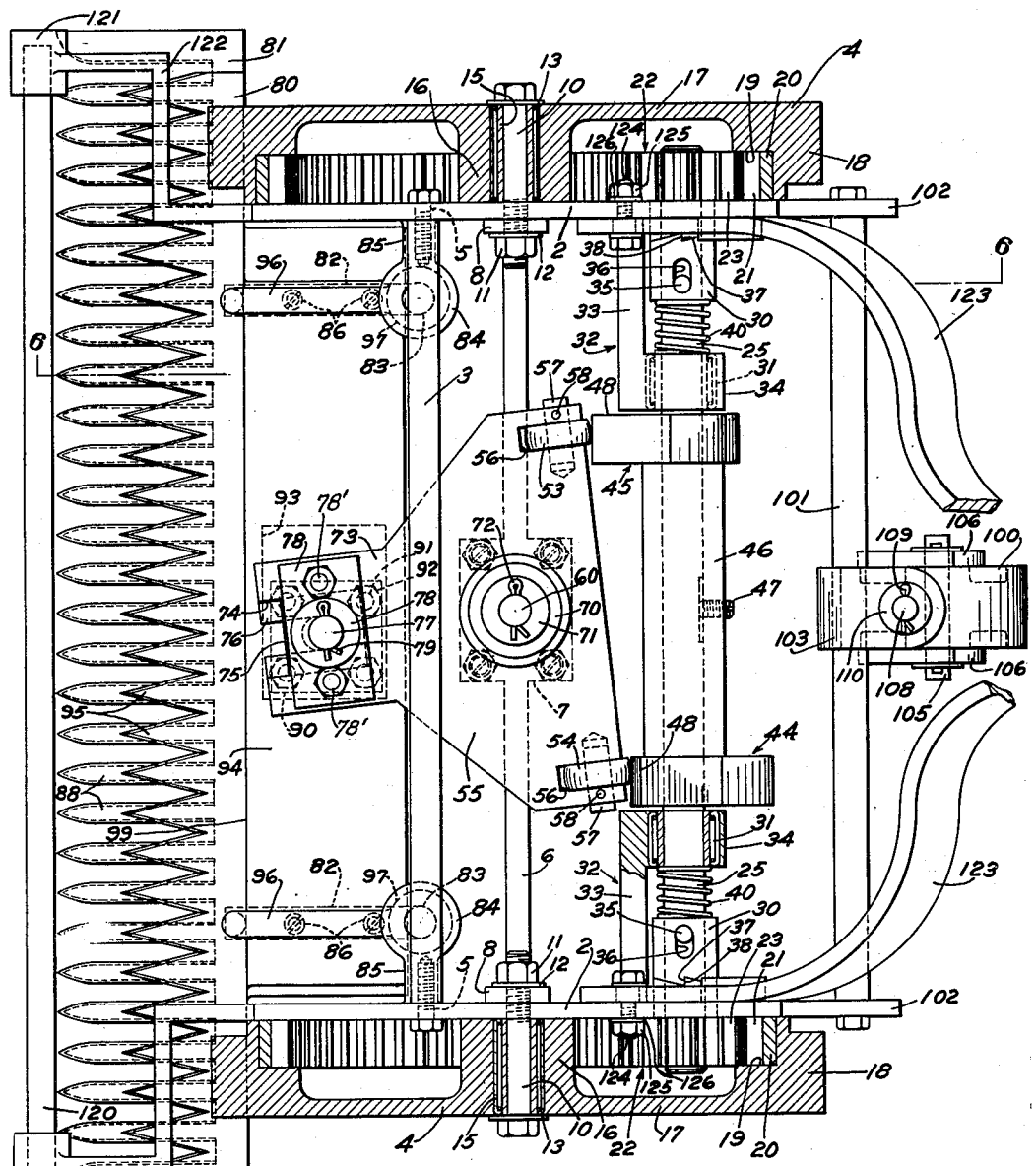
Fig. 3 is an enlarged plan view of the machine showing the traction-wheels in transverse section to illustrate the drive for the operating mechanism of the reciprocating cutter-bar.
Figure 4:
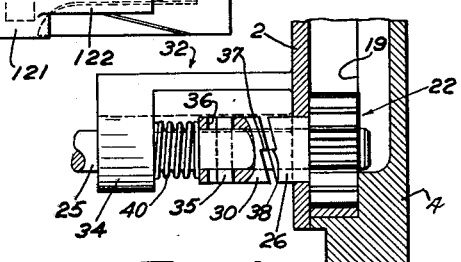
Fig. 4 is a fragmentary view of the driving means between one of the traction-wheels and the cam-shaft and illustrating the clutch-mechanism for connecting the drive.

The cam-shaft 25 is journaled to rotate in needle-bearings 31 supported by brackets 32 projecting from the inner sides of the plates 2 as shown most clearly in Figs. 3 and 4. The brackets 32 are constructed in the form of arms 33 reaching inwardly from the plates 2 toward each other and carrying bearing-bosses 34 at their ends. The arms 33 may be formed as a part of the plates 2 or welded or otherwise suitably fastened thereto.

The clutches 30 may be in the form of cylindrical sleeves mounted to slide on the cam-shaft 25 and held rotatively therewith by means of transverse-pins 35 engaging through slots 36 in opposite sides of the sleeves. The ends of the clutch-sleeves 30 may be formed with pairs of ratchet-teeth 37 disposed diametrically thereof and adapted to be engaged by similar teeth 38 on the ends of the hubs 26 of the pinions 22. Helical springs 40 encircling the cam-shaft 25 between the ends of the clutch-sleeves 30 and the bearings 34 act to force the clutch-sleeves towards the pinion-gears 22 to engage their ratchet-teeth 38 with the teeth on the ends of the hubs 26 of the pinions while being yieldable to permit release of the teeth from engagement.

Figure 5:
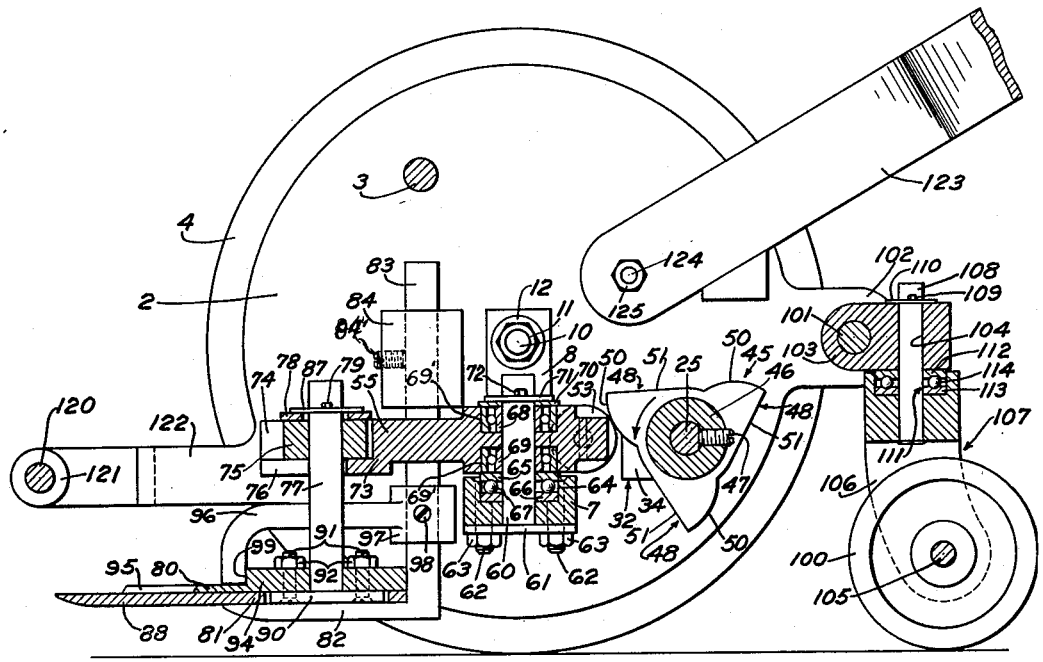
Fig. 5 is a vertical sectional view taken through the center of the machine.

Referring to Figs. 3 and 5, a pair of cams 44 and 45 mounted fast on the cam-shaft 25 are provided for oscillating the rockable member which reciprocates the slidable cutter-bar, later described. The cams 44 and 45 are connected by a relatively long hub or sleeve 46 and secured rotatively with the cam-shaft 25 by means of a set-screw 47 in the sleeve engaging a slot in the shaft, see Fig. 3. The cams 44 and 45 are of identical form, each being of generally triangular shape in side view with three lobes 48 of the same contour. The three lobes 48 of each cam are spaced equidistantly around the axis at 120° intervals, and each lobe has an arcuate working face 50 terminating in a straight edge from which a flat surface 51 recedes to join the inner end of the arcuate face 50 of the next succeeding lobe of the cam at a point near the periphery of the sleeve 46. The cams 44 and 45 may be constructed integral with their spacing hub or sleeve 46 and disposed in opposite relationship about their axis as indicated by the dotted lines shown in Fig. 1 of the drawings. The arcuate working faces 50 of the two cams 44 and 45 are arranged to engage alternately with rollers 54 and 53, respectively, that are journaled on the ends of a relatively flat oscillatable member 55 constituted as a rocker for reciprocating the slidable cutter-bar of the machine. The rollers 53 and 54 are mounted in slots 56 at the opposite ends of the rocker-element 55 and journaled on pins 57 seated in holes therein and held in place by cross-pins 58. The rollers 53 and 54 are formed with convex peripheries to adapt them to engage with the working faces 50 of the cams 44 and 45 in whatever position the rocker-element 55 may be rocked to during the engagement of the respective cams with the rollers, see Fig. 3.

The rocker-element 55 is pivoted on a vertical stud 60 held in the bearing block 7, previously mentioned as forming a part of the crossbar 6. The stud 60 projects upwardly through a central hole in the block 7 and is formed with a rectangular flange-like plate or head 61 fastened to the under side of the block by bolts 62 and nuts 63, see Fig. 5. The rocker-element 55 is journaled on the stud 60 by means of ball-bearings arranged as shown in Fig. 5, being supported by a thrust-bearing 64 constituted by races 65 and 66 held in a bore in the bearing block 7 with balls 67 between the races, the rocker-element resting on the upper race 65 to take the downward thrust. Surrounding the stud 60 are twin ball-bearings 68 and 69 having their races set into recesses 69' at the top and bottom of the rocker-element 55. A washer 70 overlies the ends of the races of the upper bearing 68 and a second smaller washer 71 is held down thereagainst by a cotter-pin 72 projecting through a hole in the end of the stud 60.

Figure 6:
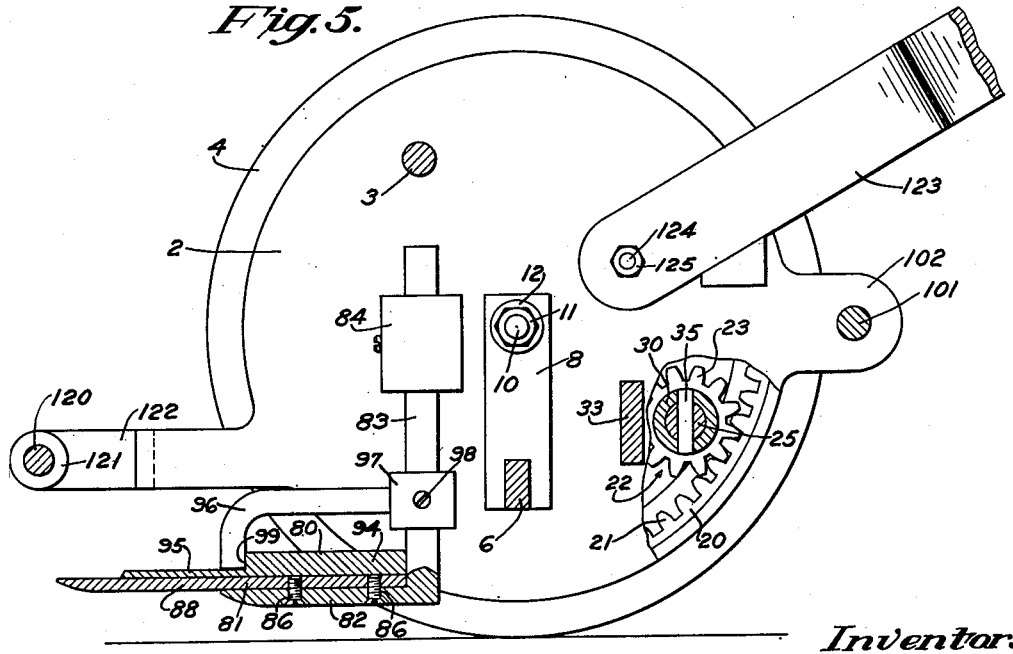
Fig. 6 is a similar sectional view taken on line 6—6 of Fig. 3 showing the gearing connections between the traction-wheel and the cam-shaft.

The rocker-element 55 is of generally triangular shape in plan view with a forked extension 73 projecting forwardly at the front. The forward extension 73 is provided with a slot 74 for receiving a slidable block 75 and the slot is formed with ledges 76 at the bottom on which the block rests. The slidable block 75 is bored to receive a stud or rod 77 passing therethrough and through a rectangular plate 78 fastened to the sides of the fork 73 by bolts 73'. Overlying the upper face of the plate 78 is a washer 87 held in place by a cotter-pin 79 projecting through a hole at the upper end of the rod 77. The rod 77 is connected to the slidable cutter-blade 80 which rests on a stationary cutter-bar 81 supported by horizontal fingers or rests 82, see Figs. 3 and 6, carried by a pair of rods 83 depending from hubs or bosses 84. The bosses 84 are supported by their narrow necks 85 fastened to the inner faces of the side plates 2 of the main frame of the machine. The rods 83 are slidable in the bores of the hubs or bosses 84 to adapt the cutter-bars 80 and 81 to be raised or lowered in relation to the ground to regulate the height of their cutting blades and thereby determine the length of the grass cut. Set-screws 84' in the sides of the hubs 84, see Fig. 5, are employed for engaging the rods 83 to secure them in adjusted position. It will be observed by reference to Fig. 3 that both cutter-blades 80 and 81 have their rearward portions of a length adapted to fit within the confines of the side plates 2 with a clearance at their ends and their forward portions of greater length to provide extended cutting faces which are serrated to form the shearing knives or blades later described.

The stationary cutter-bar 81 is fastened in fixed position on the rests 82 by means of screws 86 inserted therethrough from below and threaded into holes in the bar. The stationary cutter-bar 81 is of flat plate-like form and provided with relatively narrow, extended teeth or knife-blades 88 projecting forwardly for a considerable distance from its rearward portion. The teeth or knife-blades 88 are of relatively narrow width with parallel sides sharpened to form cutting edges and with their pointed extremities also sharpened along the edges.

The lower end of the rod 77 is connected to the reciprocable cutter-bar 80 by means of a square plate 90 welded or otherwise suitably fastened to the rod and secured to the under side of the bar by means of four bolts 91 and nuts 92, see Figs. 3 and 5. The plate 90 seats in a rectangular opening 93 in the stationary cutter-bar 81, being adapted to slide therein during the oscillation of the rocker-element 55 and reciprocation of the cutter-bar 80 back and forth on the top of the stationary bar. The reciprocable cutter-bar 80 is constructed with a relatively thick rearward plate portion 94 reduced in thickness forwardly thereof and serrated to form relatively thin knife-blades 95. The knife-blades 95 are of V-shape similar to conventional saw-teeth and beveled along their sides to sharpen the edges. When the reciprocable bar 80 is in one or the other extreme position at the ends of its traverse, see Fig. 3, the knife-blades or teeth 95 overlie the lower blades 88 on the stationary cutter-bar 81 with their pointed ends located some distance rearwardly of the points of the blades on the stationary bar. Consequently, as the slidable cutter-bar 80 is reciprocated the sharpened edges of its blades 95 will cooperate with the edges of the blades 88 with a shearing action to sever the spears of grass standing between the fixed blades.

The movable cutter-bar 80 is held down against the fixed bar 81 and directed in its reciprocation by a pair of bent rods 96 projecting forwardly and downwardly from the upright rods 83 which support the lower fixed blade 81. The rods 96 are formed with hubs 97 surrounding the vertical rods 83 and held in adjustable position thereon by means of set-screws 98, see Fig. 5. The forward terminal portions of the rods 96 are curved downwardly with their ends engaging the forward edge or shoulder 99 of the rearward plate-section 94 of the cutter-bar 80 with the flat ends of the rod slightly spaced above the top of the knife-blades 95 to hold the reciprocable cutter-bar in place on the machine.

To support the mower from the ground with the cutter-bars in horizontal relationship thereabove, a trailing wheel or roller 100 is provided at the rear, see Figs. 3 and 5. Extending across the frame of the machine between the side plates 2 is a horizontal rod 101 bolted to ears 102 projecting rearwardly from the side plates. Fastened to the rod 101 centrally thereof is a bearing member 103 formed with a vertical bore 104. The wheel 100 is journaled on an axle formed by a pin 105 projecting through holes in the sides 106 of a fork 107 reaching downwardly and rearwardly from the bearing member 103. A pivot-pin 108 extends upwardly from the top of the fork 107 through the bore 104 in the bearing member 103. The pivot-pin 108 may be fast in the fork to adapt it to rotate in the bore 104 being held in place by a cotter-pin 109 engaging a washer 110 seated against the top of the bearing member 103. A ball-bearing 111 comprising races 112 and 113 with balls 114 therebetween seats in a counterbore in the top of the fork 107 with the upper race underlying the bearing 103 to take the downward thrust and support the weight at the rear of the machine. The sides of the fork 107 are curved rearwardly to mount the trailer-wheel 100 rearwardly of the axis of the bearing for the fork to provide a caster-action so that the trailer-wheel 100 will follow the traction wheels 4 when the mower is propelled in a direction to the right or left of its straight forward course.

To protect the teeth of the cutter-bars from damage by striking a tree or other obstruction on the ground, a guard-rail 120 is positioned above and forwardly of the points of the knife-blades 88. The guard-rail 120 may consist of a rod held in hubs 121 at the ends of elbow-shaped arms 122 formed on, or fastened to, the side plates 2 of the machine.

For manually propelling and guiding the mower along the ground a handle of usual form may be provided projecting upwardly and rearwardly from the frame of the machine. As represented in Figs. 3 and 5 the handle may comprise a fork 123 composed of curved strips of metal having its ends pivoted on shouldered studs 124 bolted through holes in the side plates 2 and secured in place by nuts 126 set up against washers 125. The fork 123 may be extended rearwardly and upwardly to terminate in a handle-bar for grasping by the operator. In other cases, however, the frame of the machine may be provided with a support for a motor with gearing for connecting it to drive the internal gears 20 in the traction-wheels 4.

The construction and arrangement of the mechanism of the present mower having been described in detail its method of operation is explained as follows: With the mower in operative position with its traction-wheels 4 and trailer-wheel 100 resting on the ground it may be propelled forwardly either manually or by means of a suitable motor; or in other cases, it may be attached to a tractor or the like. During the forward motion of the mower the traction-wheels 4 will be rotated in counterclockwise direction whereby their internal gears 20 will turn the pinions 22 to rotate the cam-shaft 25 likewise in counterclockwise direction. Such rotation of the cam-shaft 25 will cause the cams 44 and 45 to turn with it and thereby their working faces 50 will act against the rollers 54 and 53, respectively, to oscillate the rocker-element 55. As shown in Fig. 3, the cam 45 has been turned to a position with its arcuate working face 50 engaging with the roller 53 at substantially the end of the thrust of the cam thereagainst so that the rocker-element 55 has been rocked into its extreme position as shown in this view to carry its fork 73 toward the right as viewed from the front of the machine. On the other hand, the roller 54 at the opposite end of the rocker element 55 will have ridden off from the working face 50 of the cam 44 to slide down its flat face 51 without any considerable friction between the bearing faces. With the rocker-element 55 oscillated to the position shown in Fig. 3 the movable cutter-bar 80 will have been carried to the right into position with its saw-tooth blades 95 overlying the lower knife-blades 88 substantially in register therewith. Thus, at the end of this stroke of the movable cutter-bar 80 the knife-blades 88 and 95 will be in position to receive the spears of grass in the spaces therebetween and during the continued forward movement of the mower the reciprocable blade 80 will be traversed in the opposite direction to shear the grass standing between the knife-blades. This last motion of the reciprocable cutter-bar 80 is caused by the turning of the cam 44 which causes its curved operating face 50 to act against the roller 54 to oscillate the rocker-element 55 in the opposite direction or clockwise about the axis of its pivot-bearing. In this way the cams 44 and 45 rotated by the turning of the cam-shaft 25 set up a substantially constant rocking motion of the rocker-element 55 to reciprocate the movable cutter-bar 80 back and forth longitudinally of the fixed cutter-bar 81. It will be understood that the rod 77 which is connected to the movable cutter-bar 80 will be oscillated laterally back and forth in a substantially straight path with its mounting in the slide-block 75 accommodated during this motion by a slight sliding action of the block in the slot 74 of the fork 73 on the rocker-element 55.

It should be explained that the drive from the traction-wheels 4 and their ring-gears 20 through the pinions 22 to the cam-shaft 25 responds to any differential motion of the two traction-wheels 4 by means of the clutches 30 which connect the pinions to the cam-shaft. That is, when one traction-wheel 4 rotates faster than the opposite wheel, due to a circular course of the mower along the ground, the wheel having the greater motion will have its pinion 22 engaged positively with its respective clutch-sleeve 30; whereas, the opposite pinion may lag behind in its rotation due to the ratchet connection between its hub and the sleeve 30. Thus, the mower may be turned in circular courses or swung around sharply at the end of cutting a swath with the clutches for the gears providing for the differential motion between the traction-wheels; for example, one wheel 4 may be turning forwardly while the opposite one rotates in the reverse direction. Likewise, when the mower is drawn rearwardly along the ground with the traction-wheels 4 turning in clockwise direction and the pinions 22 driven in the same direction the ratchet connection between the hubs of the pinions 22 and the clutch-sleeves 30 will permit rotation of the gears without rotating the cam-shaft 25 so that the rocker-element 55 will remain at rest without reciprocating the movable cutter-bar 80.

It will be observed from the foregoing description that the present invention provides a relatively simple and compact mechanism for the operation of lawn-mowers either manually propelled or driven by power and with an improved construction which affords important advantages hereinbefore set forth and noted as follows: First, the operating parts of the mechanism are provided with friction-reducing bearings such as the needle- and ball-bearings specified to insure easy operation of the mower in propelling it along the ground; and secondly, these friction-reducing bearings also provide for long wear of the operating parts to avoid their deterioration and require replacement.

As a further important improvement, the shape and arrangement of the blades of the cutter-bars assures maximum efficiency of cutting action, the lower fixed knife-blades being projected forwardly beyond the points of the oscillating knife-blades operate to gather leaning or inclined grass-spears to properly present them to the cutting edges of the knives in erect position, thereby insuring an evenly cut lawn. Another advantage secured by the novel construction of the knife-blades is due to the manner of their operation with the inclined cutting edges of the blades on the reciprocable bar cooperating with straight cutting edges of the fixed blades in such manner as to practically eliminate any shearing action tending to force some of the fine grass spears out of position between the knives. In other words, the groups of grass spears are held located in proper position between the straight sides of the fixed knife-blades with the inclined edges of the tapered knives causing the shearing action without any tendency to force the grass away from the knives.

While the invention is herein shown as embodied in a preferred form of construction, it is to be understood that various modifications may be made in the shape and arrangement of the parts of the mower without departing from the spirit or scope of the invention as expressed in the following claims. Therefore, without limiting ourselves in this respect, we claim:

1. In a mowing machine comprising a frame supported by traction-wheels journaled thereon and embodying relatively-reciprocable cutter-bars mounted on said frame and provided with cooperating sharpened teeth, the combination of a rocker-element pivotally mounted on said frame for relatively reciprocating said bars, bearings on said frame, a cam-shaft journaled in said bearings on the frame, oppositely-arranged cams fast on said shaft for oscillating the rocker-element in a horizontal plane, gears rotatable on the cam-shaft and connected to be driven from the traction-wheels, and clutches on the cam-shaft for connecting the gears to rotate the cam-shaft in one direction only while permitting lost motion between the gears and cam-shaft to provide for differential motion of the traction-wheels.

2. In a mowing machine comprising a frame supported by traction-wheels journaled thereon and cutter-bars mounted on the frame and having cooperating sharpened teeth, the combination of a rocker-element pivotally mounted on the frame for relatively reciprocating said cutter-bars, bearings on the frame, a cam-shaft journaled in said bearings on the frame, oppositely arranged cams fast on said cam-shaft for oscillating said rocker-element in a horizontal plane, pinion-gears rotatable on the cam-shaft and connected to be driven from said traction-wheels, one-way clutches on the cam-shaft connecting said pinion-gears to rotate the cam-shaft, and springs for normally maintaining said clutches in connection with the pinion-gears while permitting lost motion between the gears and cam-shaft to adapt the traction-wheels to turn with differential motion.

3. In a mowing machine comprising a frame, a pair of cutter-bars mounted on said frame and having cooperating sharpened teeth, the combination of a rocker-element pivotally mounted on said frame and connected to one of the cutter-bars to impart relative reciprocation between said cutter-bars, rollers journaled in spaced-apart relationship on the rocker-element, bearings on the frame, a cam-shaft journaled in said bearings, a pair of cams on the cam-shaft engaging the rollers on the rocker-element for rocking said rocker-element in a horizontal plane, gears rotatable on the cam-shaft and driven from the traction-wheels, clutches slidable on the cam-shaft and forced with ratchet-teeth engageable with correspondingly-formed ratchet-teeth on the gears to connect the latter for driving the cam-shaft, and resilient means for normally maintaining said clutches with their teeth in engagement with the teeth on the gears while being disengageable therefrom to provide for differential motion between the traction-wheels.

4. In a mowing machine comprising a frame with traction-wheels journaled thereon for supporting said frame, relatively reciprocable cutter-bars mounted on the frame and having cooperating sharpened teeth, the combination of a rocker-element pivotally mounted on said frame for relatively reciprocating said cutter-bars, said rocker-element having rollers journaled in spaced-apart relationship on said rocker-element, bearings on the frame, a cam-shaft journaled in the bearings on the frame, a pair of cams fast on said shaft for oscillating the rocker-element, said cams formed with pointed lobes engaging said rollers on the rocker-element to oscillate said element in a horizontal plane, and differential gearing-connections between the traction-wheels and cam-shaft for rotating the cams in one direction while permitting reverse rotation of the gears to adapt the traction-wheels to turn independently of each other.

5. In a mowing machine comprising a frame supported by traction-wheels journaled thereon, the combination of a mounting supported by said frame and formed with a pivot bearing at the center thereof, a rocker-element journaled on said pivot bearing to oscillate in a horizontal plane, a pair of rests supported for vertical adjustment on the frame, a stationary cutter-bar fastened to said rests on the frame, a movable cutter-bar mounted on the stationary bar to slide longitudinally thereof, means pivotally connecting the rocker-element to reciprocate the movable cutter-bar while permitting vertical adjustment of the cutter-bars without disturbing said pivotal connecting means, a pair of cams rotatably mounted on said frame for oscillating the rocker-element, and means operated by the traction-wheels for rotating said cams during the travel of the machine along the ground.

6. In a mowing machine comprising a frame supported by traction-wheels journaled thereon, and having side plates with cross-members connecting said side plates, the combination of a bearing on one of said cross-members, a rocker-element journaled on said bearing to adapt it to oscillate in a horizontal plane, said rocker-element formed with a fork, a cutter-bar fixedly mounted on said frame, a movable cutter-bar mounted adjacent said fixed bar to reciprocate with respect to the fixed bar, means for supporting said cutter-bars to adapt them to be adjusted vertically at varying heights above the ground, a vertical stud connected to the movable cutter-bar and engaging through the fork on the rocker-element to adapt the latter to reciprocate said cutter-bar, cam-means journaled on said frame for oscillating the rocker-element, and means driven from the traction-wheels to rotate the cams during the travel of the machine on the ground.

7. In a mowing machine comprising a frame supported by traction-wheels journaled thereon and having side plates with a crossbar extending therebetween, the combination of a pivot bearing on said crossbar, a rocker-element pivoted on the bearing on the crossbar to adapt it to oscillate in a horizontal plane, said rocker-element formed with a fork, a stationary cutter-bar fixedly mounted on the frame, a movable cutter-bar overlying the stationary cutter-bar and adapted for reciprocation relatively thereto, rests on the frame for supporting said cutter-bars, vertical rods slidable on the frame for supporting the rests to adapt the cutter-bars to be adjusted to vary their height above the ground, means for securing said rods to hold the cutter-bars in adjusted position above the ground, means on the frame operative during the travel of the machine on the ground to oscillate the rocker-element, and means connected to the movable cutter-bar and slidably engaging the fork of the rocker-element to cause the latter to reciprocate the movable cutter-bar.

8. In a mowing machine comprising a frame supported by traction-wheels journaled at the sides of the frame and a pair of cutter-bars mounted on the front of the frame to adapt them for relative reciprocation, the combination of a rocker-element pivotally mounted at the center of the frame, a vertically-projecting stud on one of the cutter-bars engageable through a slidable bearing on the rocker-element to pivotally connect it thereto to reciprocate said cutter-bar relative to the other bar, rollers journaled in spaced-apart relationship on the rocker-element, a cam-shaft journaled on said frame, a pair of triangularly-shaped cams on said cam-shaft having spaced radial lobes arranged in opposite relationship to adapt said lobes to intermittently engage the rollers on the rocker-element to oscillate the latter, and means operated by the traction-wheels for rotating said cams during the travel of the machine along the ground.

JOHN F. McSHANE.
WALTER LOGAN.

References Cited in the file of this patent

UNITED STATES PATENTS

| Number | Name | Date |
|---|---|---|
| 283,425 | Scofield | Aug. 21, 1883 |
| 284,435 | Keeler | Sept. 4, 1883 |
| 632,173 | Cameron | Aug. 29, 1899 |
| 673,016 | Coffinberry | Apr. 30, 1901 |
| 760,695 | Leavitt | May 24, 1904 |
| 925,352 | Kryger | June 15, 1909 |
| 956,385 | Lovett | Apr. 26, 1910 |
| 961,485 | Dale et al. | June 14, 1910 |
| 2,011,822 | Munschauer | Aug. 20, 1935 |
| 2,288,498 | Underwood | June 30, 1942 |